Oct. 1, 1957            M. L. GLASS            2,807,944
GLASS COFFEE PROTECTOR
Filed Jan. 29, 1954
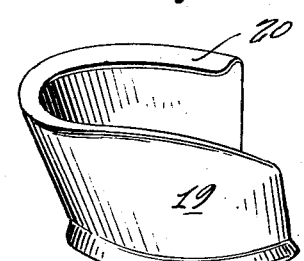
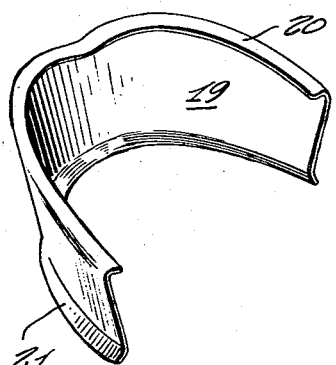
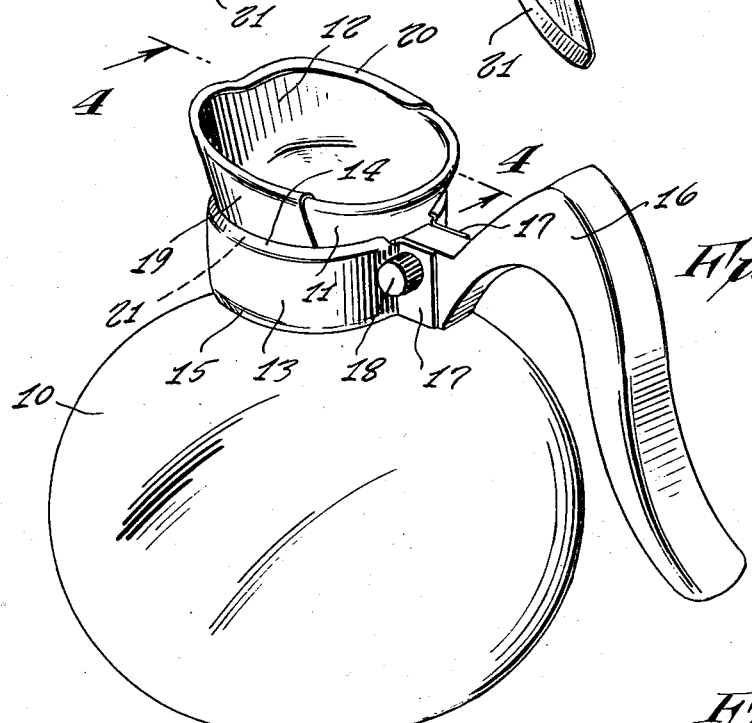
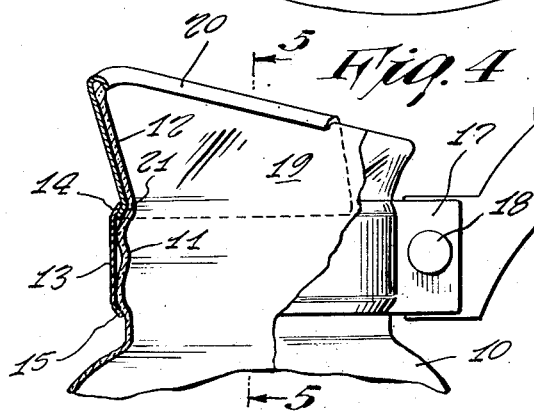
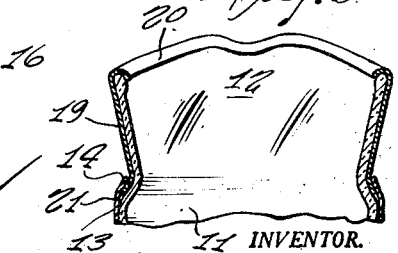
INVENTOR.
MURRAY L. GLASS
BY
Carl Miller
ATTORNEY

United States Patent Office 2,807,944
Patented Oct. 1, 1957

2,807,944

GLASS COFFEE PROTECTOR

Murray L. Glass, New York, N. Y.

Application January 29, 1954, Serial No. 406,957

1 Claim. (Cl. 65—31)

This invention relates to glass containers of the type adapted to hold coffee or the like and more particularly to means for protecting the neck portion of the container from breakage, particularly along its upper edge.

In coffee containers having a spherical body portion and a narrow cylindrical neck, cylindrical clamps are provided around the neck portion, the free ends of these clamps mounting the handle. However, such clamps are objectionable in that the upper edge of the neck is exposed and subject to breakage.

It is accordingly a principal object of the present invention to provide a brace adapted to fit about the narrow neck of the glass container above the handle securing clamp, this brace being formed on its upper periphery with an inwardly extending lip and surrounding and protecting the upper glass neck edge.

It is another object of the present invention to provide a brace of the above type which has an outwardly turned lower edge which is secured within the upper edge of the handle supporting clamp and which is easily and readily mounted on conventional glass containers of the type adapted to hold coffee.

Other objects of the present invention are to provide a brace for protecting the narrow neck of a glass container bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Figure 1 is a side perspective view of the invention;

Fig. 2 is a rear perspective view thereof;

Fig. 3 is a perspective view showing the device in use on a coffee container;

Fig. 4 is a vertical sectional view taken along the line 4—4 of Fig. 3; and

Fig. 5 is a vertical sectional view taken along the line 5—5 of Fig. 4.

Referring now to the figures, 10 represents the spherical body portion of a container of glass for coffee or the like, having the usual narrow cylindrical neck portion 11 including the pouring spout 12. The usual cylindrical clamp 13 having the inwardly bent upper edge 14 and the inwardly bent lower edge 15 is secured to the handle 16 by means of the flanges 17 and the tightening screw 18. As is well known in such constructions, upon unscrewing the screw 18, the handle 16 and clamp 13 are able to be removed from the neck 11 of the container, the clamp 13 being of spring metal and expanding away from the neck.

In the practice of my invention, a brace is provided for protecting the neck 11 above clamp 13 against accidental breakage and particularly the upper edge thereof. This brace includes a body portion 19 of metal or other suitable unbreakable material and adapted to surround the upper portion of the neck 11 adjacent the pouring spout 12 (Fig. 3) substantially as illustrated. The body 19 along its upper edge is provided with inwardly bent lip 20 which passes over and behind the upper edge of the neck whereby to protect the same against breakage. The lower edge of the portion 19 is also provided with an outwardly bent flange 21 which is secured beneath the inwardly bent upper edge 14 of clamp 13 (Fig. 4), whereby to firmly retain the same in position. Thus, the brace will thoroughly protect the upper edge of the glass neck against accidental breakage while at the same time it is easily and firmly mounted on the container by means of the clamp 13. Thus, the upper edge of the container may be accidentally knocked against objects without damage to the glass neck 11 and effecting thereby an economy of containers, which would otherwise have to be replaced.

While various changes may be made in the detail construction, it shall be understood that such changes shall be within the spirit and scope of the present invention as defined by the appended claim.

Having thus set forth and disclosed the nature of my invention, what is claimed is:

In a coffee container, a bowl having a frangible cylindrical neck portion and pouring spout at the upper end thereof, a V-shaped clamp partially surrounding said neck, a handle releasably engaged with the ends of said clamp, the upper end of said clamps having an upwardly and inwardly extending flange, said neck having a portion corresponding to the shape of said flange immediately below said pouring spout, an infrangible brace having a substantially V-shaped body portion surrounding said pouring spout above said clamps and having a continuous inwardly and downwardly extending lip disposed over said spout, said brace having at the lower edge thereof a continuous outwardly extending flange, said upwardly and inwardly extending flange of said clamp overlying said correspondingly shaped portion of said neck, and said outwardly extending flange of said brace being secured between said respective upwardly and inwarly extending flange of said clamp and said correspondingly shaped portion of said neck.

References Cited in the file of this patent

UNITED STATES PATENTS

| | | |
|---|---|---|
| 958,312 | Reynolds | May 17, 1910 |
| 2,072,934 | Wolcott | Mar. 9, 1937 |
| 2,259,856 | Moore | Oct. 21, 1941 |
| 2,432,237 | Hadert | Dec. 9, 1947 |